United States Patent
Kim

[19]

[11] Patent Number: 6,081,341
[45] Date of Patent: Jun. 27, 2000

[54] MULTIFUNCTIONAL MACHINE EQUIPPED WITH JAM RECOVERY DEVICE AND SELECTIVE JAM RECOVERY METHOD

[75] Inventor: Kwang-Seuk Kim, Suwon, Rep. of Korea

[73] Assignee: SamSung Electronics Co., Ltd., Suwon, Rep. of Korea

[21] Appl. No.: 09/081,648

[22] Filed: May 20, 1998

[30] Foreign Application Priority Data

May 20, 1997 [KR] Rep. of Korea ...................... 97-19366

[51] Int. Cl.$^7$ ...................................................... G06F 15/00
[52] U.S. Cl. ...................... 358/1.14; 358/1.12; 358/1.13; 358/1.15; 399/19; 399/21
[58] Field of Search .................................. 358/1.12, 1.13, 358/1.14, 1.15, 1.16, 437, 444, 468, 405, 406, 434; 399/19, 20, 21, 18; 355/407, 408

[56] References Cited

U.S. PATENT DOCUMENTS

| | | | |
|---|---|---|---|
| 4,317,629 | 3/1982 | Kuseski | 355/24 |
| 4,958,298 | 9/1990 | Okamoto | 358/1.14 |
| 5,018,081 | 5/1991 | Yamaguchi et al. | 358/1.14 |
| 5,580,046 | 12/1996 | Beaufort et al. | 271/3.16 |
| 5,615,315 | 3/1997 | Nakajima | 358/1.16 |
| 5,664,074 | 9/1997 | Kagayama et al. | 358/1.14 |
| 5,680,221 | 10/1997 | Takano | 358/296 |
| 5,680,522 | 10/1997 | Kasai | 358/1.14 |
| 5,745,661 | 4/1998 | Koh et al. | 358/1.14 |

*Primary Examiner*—Edward L. Coles
*Assistant Examiner*—Mark Wallerson
*Attorney, Agent, or Firm*—Robert E. Bushnell, Esq.

[57] ABSTRACT

Disclosed are a multifunctional apparatus equipped with a jam recovery device and a selective jam recovery method. The multifunctional apparatus has an image forming unit enabling the apparatus to record image data onto a recordable medium. The multifunctional apparatus can record two types of data. When a page of a first type of data is stored in a page queue processor of the multifunctional apparatus and starts to be recorded onto a first page of a recordable medium, the page queue processor deletes the page of the first type of data according to whether the first page of the recordable medium has been successfully discharged from the multifunctional apparatus and, importantly, also according to a condition of a discharge error recovery function. However, when a page of a second type of data is stored in the page queue processor and starts to be recorded onto a second page of a recordable medium, the page queue processor deletes the page of the second type of data according only to whether the second page of the recordable medium has been successfully discharged, and not according to the condition of the discharge error recovery function. In other words, the page queue processor deletes the first type of data according to a condition of the discharge error recovery function. Whereas, the page queue processor deletes the second type of data without regard to the condition of the discharge error recovery function. When the page of the recordable medium is discharged successfully, the corresponding data is definitely removed from the page queue processor.

17 Claims, 4 Drawing Sheets

MULTIFUNCTIONAL MACHINE EQUIPPED WITH JAM RECOVERY DEVICE AND SELECTIVE JAM RECOVERY METHOD

CLAIM OF PRIORITY

This application makes reference to, incorporates the same herein, and claims all benefits accruing under 35 U.S.C. § 119 from an application entitled Multifunctional Machine Equipped with Jam Recovery Device and Selective Jam Recovery Method earlier filed in the Korean Industrial Property Office on May 20, 1997, and there duly assigned Serial No. 19366/1997, a copy of which is annexed hereto.

BACKGROUND OF THE INVENTION

1. Technical Field

The present invention relates to a multifunctional apparatus, and more particularly, a multifunctional apparatus equipped with a paper jam recovery device and a method for recovering from a paper jam.

2. Related Art

Office automation equipment can be used to perform many functions such as printing documents, transmitting facsimile documents, scanning documents, and copying documents. Office automation equipment may be manufactured in the form of single-function individual devices for example printers, facsimile machines, scanners and copiers, to perform the functions listed above. Such single-function devices have been designed to perform primarily one task. The purchase of several single-function devices may impose an undesired burden on the financial budgets of users. In order to solve this problem, the functionality of different single-function individual devices can be combined into a one multifunctional device. The economic burden on users can be lessened because users can purchase one multifunctional device in lieu of purchasing several single-function devices.

One example of a conventional single-function device is a conventional scanner device. A conventional scanner is designed to convert images recorded on a document into a computer-compatible electronic form. The images recorded on the document can be scanned as follows. An amount of light is first transmitted to the document from a source. As a result, the image data on the document causes some of that light to be reflected in a particular pattern. The pattern of reflected light is then supplied to a fixed array of light sensors through an intermediate image reduction mirror. The light sensors in the array can be charge-coupled devices (CCD) or contact image sensors (CIS). Then circuitry in the scanner senses the status of each sensing element in the array one by one, in order, to register the brightness of each point in each individual scan line. After the scanner has collected and arranged the data from each sensor, the next line of data can be read. Image data read from a document can be recorded onto a recordable medium. Image data read from a document can be considered as scanned data or scan data.

There are two main categories of conventional scanner devices: the shuttle type and the array type. The array type shall be considered first. The array type of scanner scans the data recorded on the document per a line unit, when a line scanner module having a size similar to, or larger than, the width of the document is fixed at a predetermined position inside of the multifunctional device. The scanner module is typically stationary while the document is transported along a path of conveyance through the scanner device.

The shuttle type of scanner can be described as follows. The shuttle type of scanner typically has a guide axis, a transporting belt, and a driving source for driving the guide axis and the transporting belt, which are all established at the scanning unit, in order to reciprocate the scanner module perpendicular to the document transporting direction. Thus, the scanner module is typically transported back and forth along a first path while the document is transported along a second path through the scanner device, the first and second paths being perpendicular to one another.

One example of a multifunctional device is a printer-scanner-facsimile machine. The printer-scanner-facsimile machine is capable of performing the functions of a printer, scanner, and facsimile machine, and can include a scanning unit, an image forming unit, and transportation rollers. The printer-scanner-facsimile machine multifunctional device can record three different types of data onto a recordable medium. In other words, the printer-scanner-fax machine can print three different types of data onto a piece of paper. The aforementioned three types of data include fax data, print data, and scan data. In this instance, fax data is data which is received through a telephone line from a remote facsimile machine, print data is data which is received from a connected host computer, and scan data is data which is received from a scanner unit.

A conventional printer-scanner-fax machine can use a first set of rollers to transport a blank page of paper from a first tray to an image-forming unit, form an image on the page of paper using the image-forming unit, and then use a second set of rollers to transport the page of paper to a second tray. The image formed on the page of paper can be developed from fax data, scan data, or print data, as discussed above.

The page of paper can become jammed or stuck in the conventional printer-scanner-fax machine described above at any one of several locations. For example, the page of paper could become jammed near the first set of rollers, near the image forming unit, or near the second set of rollers. When the page of paper becomes jammed, a paper jam error condition exists. I have found that when a paper jam error occurs during a printing process, the conventional printer-scanner-fax machine often is unable to efficiently recover from the error condition.

Examples of devices and methods controlling printing processes are disclosed by U.S. Pat. No. 4,958,298 for Printing Apparatus Having Means for Clearing Unwanted Print Data Stored in an Input Buffer and Abolishing Ensuing Residual Print Data issued to Okamoto; U.S. Pat. No. 5,018,081 for Printer With Automatic Restart issued to Yamaguchi et al.; U.S. Pat. No. 4,317,629 for Job Recovery Method And System issued to Kuseski; U.S. Pat. No. 5,680,522 for Printer System And Method issued to Kasai; U.S. Pat. No. 5,580,046 for Selective Ejection Of Sensed Paper Jams In Signal Sheet Paper Processing Equipment issued to Beaufort et al; U.S. Pat. No. 5,615,315 for Output Apparatus issued to Nakajima; U.S. Pat. No. 5,680,221 for Digital Copying Apparatus Capable Of Efficiently Restarting A Copy Operation After A Paper Jam issued to Takano; and U.S. Pat. No. 5,664,074 for Printing Control Apparatus With Error Recovery Function And Its Print Control Method issued to Kageyama.

Currently there do exist some devices capable of controlling printing processes under certain conditions. However, I have discovered that it would be desirable to develop a printer-scanner-facsimile machine multifunctional device which further enhances the efficiency of printing processes.

SUMMARY OF THE INVENTION

Therefore, it is an object of the present invention to enhance the efficiency of a printing process by selectively applying a jam recovery method when a jam occurs in a printing device.

It is another object of the present invention to enhance the efficiency of printing by selectively applying a jam recovery method when a document jam occurs while discharging a document from a printing device.

It is yet another object of the present invention to enhance the printing efficiency of a printing device by selectively applying a jam recovery method when a jam occurs while a recordable medium is being discharged from the printing device, whereas the jam recovery method is selectively applied according to the type of data recorded onto the recordable medium.

The above objects and other objects of the present invention can be achieved by a multifunctional machine equipped with a jam recovery device and a selective jam recovery method, as described below. First, a multifunctional machine comprising a printing device receives data which is to be recorded onto a recordable medium. The type of data received by the printing device can be any one of three types of data: print data, facsimile data, or scan data. The print data is data transmitted from a host computer, the facsimile data is data transmitted from a remote facsimile device, and the scan data is data transmitted from a scanner unit. Next, a page queue processor records the received data onto a page of paper by operating an image-forming unit. In other words, the page queue processor causes a page of received data to be printed onto a page of paper. Regarding jam recovery, there are three scenarios to be discussed. The first scenario exists when the data received by the printing device is facsimile data. The second scenario exists when the data received by the printing device is either print data or scan data, and a discharge error recovery function is set. The third scenario exists when the data received by the printing device is either print data or scan data, and the discharge error recovery function is not set.

In the aforementioned first scenario, a page of data received by the printing device is facsimile data. After the page of facsimile data has been successfully recorded onto a page of paper, the page of facsimile data will not be deleted from a page queue processor of the printing device until the page of paper has been successfully discharged from the printing device. Note that the page of facsimile data will not be deleted from the page queue processor of the printing device until the page of paper has been successfully discharged from the printing device, regardless of the condition of the discharge error recovery function.

In the aforementioned second scenario, a page of data received by the printing device is either print data or scan data, and the discharge error recovery function is set. After the page of data, either print data or scan data, has been successfully recorded onto a page of paper, the page of data, either print data or scan data, will not be deleted from the page queue processor without verification that the page of paper has been successfully discharged from the printing device.

In the aforementioned third scenario, a page of data received by the printing device is either print data or scan data, and the discharge error recovery function is not set. After the page of data, either print data or scan data, has been successfully recorded onto a page of paper, the page of data, either print data or scan data, will be deleted from the page queue processor without verification that the page of paper has been successfully discharged from the printing device.

When the printing device receives facsimile data to be printed and the facsimile data is recorded onto a page of paper, a jam might occur prior to the page of paper being discharged from the printing device. When such a jam occurs, then a first control unit controls the facsimile data, which will need to be reprinted onto another page of paper, while waiting for the discharge error condition to be cleared. Note that the condition of the discharge error recovery function is not relevant to the subject of the first control unit controlling the facsimile data.

When the printing device receives either print data or scan data to be printed, and the print data or scan data is recorded onto a page of paper, a jam might occur prior to the page of paper being discharged from the printing device. When such a jam occurs, then a second control unit controls the print data or scan data, which will need to be reprinted onto another page of paper, while waiting for the discharge error condition to be cleared. The second control unit selectively controls the print data or scan data, according to whether the discharge error recovery function is set. In addition, a page information removing unit removes the print data, facsimile data, and scan data from the page queue processor. Note that the second control unit can remove the print data, scan data, and facsimile data from the page queue processor, when the discharge error recovery function is not set.

The above objects and other objects of the present invention can be achieved by a multifunctional machine equipped with a jam recovery device and a selective jam recovery method, as described below. A data page stored in the page queue processor starts to be printed. When the data being printed is a first type of data, it is necessary to wait until the page containing the first type of data is successfully discharged after printing is completed, according whether the discharge error recovery function is set. When the data is a second type of data, it is necessary to wait until the page containing the second type of data is successfully discharged after printing is completed, regardless of whether the discharge error recovery function is set. When the data page is discharged successfully, the information corresponding to the printed data page is removed from the page queue processor, regardless of whether the discharge error recovery function is set. According to one preferred embodiment of the present invention, the first data can be either print data or scan data, and the second data is facsimile data.

Preferably, when the data page discharge error is generated, the data page can be reprinted after waiting for the error condition to be cleared. Preferably, in the case that an engine error is generated without completing the printing of the data page, it is necessary to wait for the error condition to be cleared.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1A:
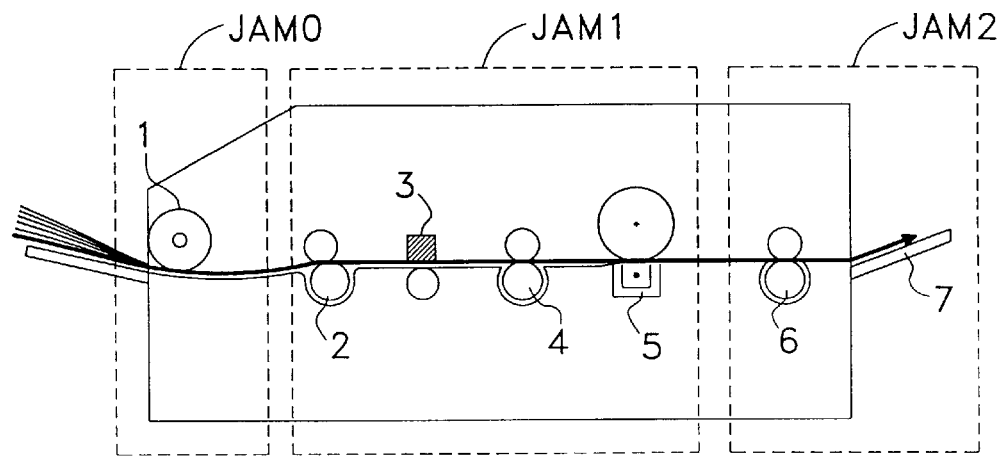
FIG. 1A illustrates a conventional multifunctional apparatus, including an image forming unit, transporting an original document and a recordable medium along one path of conveyance.

Turn now to FIG. 1A, which illustrates a conventional multifunctional apparatus, including an image forming unit, transporting an original document and a recordable medium along one path of conveyance. The conventional multifunctional apparatus of FIG. 1A includes an image forming unit utilizing an electrophotographic developing method. Also, the multifunctional apparatus of FIG. 1A includes a scanning unit of the array type. As shown in FIG. 1A, the original document and the recordable medium are stacked in the same area and printing/scanning operations are performed by transporting the original document and the recordable medium.

Figure 1B:
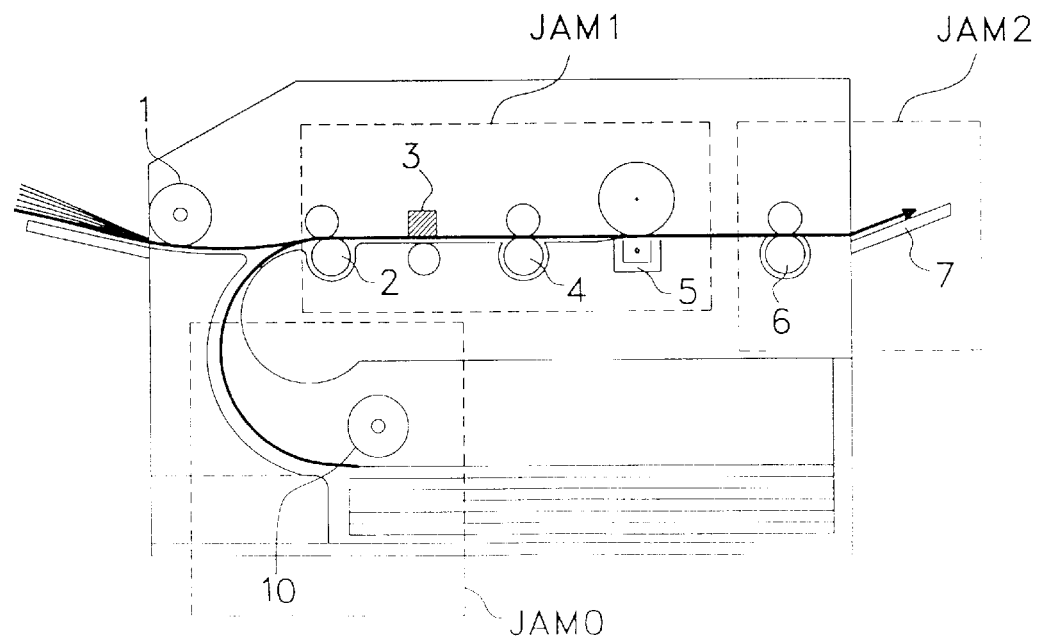
FIG. 1B illustrates a conventional multifunctional apparatus, including an image forming unit, transporting an original document along a first path of conveyance and a recordable medium along a second path of conveyance.

Refer now to FIG. 1B, which illustrates a conventional multifunctional apparatus, including an image forming unit, transporting an original document along a first path of conveyance and a recordable medium along a second path of conveyance. The conventional multifunctional apparatus of FIG. 1B includes an image forming unit utilizing an electrophotographic developing method. Also, the multifunctional apparatus of FIG. 1B includes a scanning unit of the array type. As shown in FIG. 1B, the original document and the recordable medium are stacked in different areas and the scanning/printing are performed by picking up and transporting the original document and the recordable medium.

The operation of the multifunctional machine illustrated in FIG. 1A shall now be briefly explained. The original document is picked up by a pickup roller 1 and then transported through a transporting roller 2 to a scanning unit 3 of array type for scanning. Afterwards, the original document passes through a registration roller 4 to an image forming unit 5. Then the original document passes to a fixing unit 6 and then is discharged to an output tray 7 through a print discharge roller (not shown).

The operation of the multifunctional machine illustrated in FIG. 1B shall now be briefly explained. An original document is picked up by first pickup roller 1, transported by transportation roller 2, scanned by scanning unit 3, and output to tray 7. Then the recordable medium is picked up by the second pickup roller 10 and it is transported to the registration roller 4 by the transporting roller 2. At this time, after an image forming unit 5 performs printing on the transported recordable medium, the recordable medium passes through a fixing unit 6 and is then discharged to the output tray 7 through the print discharge roller (not shown).

In the multifunctional device, a page of paper is usually used as the recordable medium. In the case that the printing is performed using the multifunctional machine of the conventional electrophotographic developing type shown in FIGS. 1A and 1B, a paper jam frequently occurs. A paper jam occurs when the original document or the recordable medium are not smoothly transported through the multifunctional machine.

Conventionally, paper jams occur in the following three situations. The first type of paper jam occurs when the paper is not picked up and the printing is not performed. This case is indicated as a JAM0 in FIGS. 1A and 1B.

The second type of paper jam occurs when the paper is picked up and the printing process begins. In other words, the process of recording data onto the recordable medium has begun. However, the data is not completely recorded onto the recordable medium due to a problem such as a problem which occurred during the transporting of the paper. This case is indicated as a JAM1 in FIGS. 1A and 1B.

The third type of paper jam occurs after all data has been recorded onto the recordable medium. This third type of paper jam is known as a discharge error. In other words, the printing is completed behind the area of JAM1. However, the recordable medium containing data is not discharged correctly due to a problem such as a problem which occurred in transporting the recordable medium to the output tray 7. This case is indicated as a JAM2 in FIGS. 1A and 1B. A JAM2 is also referred to as a discharge error.

In the conventional multifunctional machine of electrophotographic developing type, when the JAM0 or JAM1 is occurred, it is conventional to perform a jam recovery. In other words, typically the entire printing process is performed again after removing the jammed paper and after clearing the error condition.

However, in the case of the jam recovery regarding the JAM2, sometimes it is not necessary to perform the entire printing process again. This is true because the data can be held in a memory or in a page queue processor. It can be more efficient to utilize the data held in the memory or in the page queue processor. The data held in the memory or held in the page queue processor can be recorded onto a new page of paper.

However, printing performance can be greatly influenced when data is continuously printed. This is true because data held in the page queue processor must be carefully managed when a JAM2 occurs. In other words, to preserve the data of a page to be printed, a corresponding amount of memory cannot be used for any other purpose until the printing of the corresponding page is completed and the paper is discharged successfully. Accordingly, processing the next page is delayed by this.

However, when the JAM2 occurs in the conventional multifunctional machine of the conventional electrophotographic developing type, the jam recovery method is uniformly applied regardless of the preference to the printing performance or to the complete data output, and thereby efficient data printing cannot be performed.

The objects, characteristics and advantages of the present invention shall be more clearly understood through the preferable embodiments described below, with reference to the attached drawings. Since the terms mentioned later are judged based upon the function of the present invention and they can be changed according to the technician's intention or a usual practice, the terms should be judged considering the overall contents of the specification of the present invention.

Figure 2:
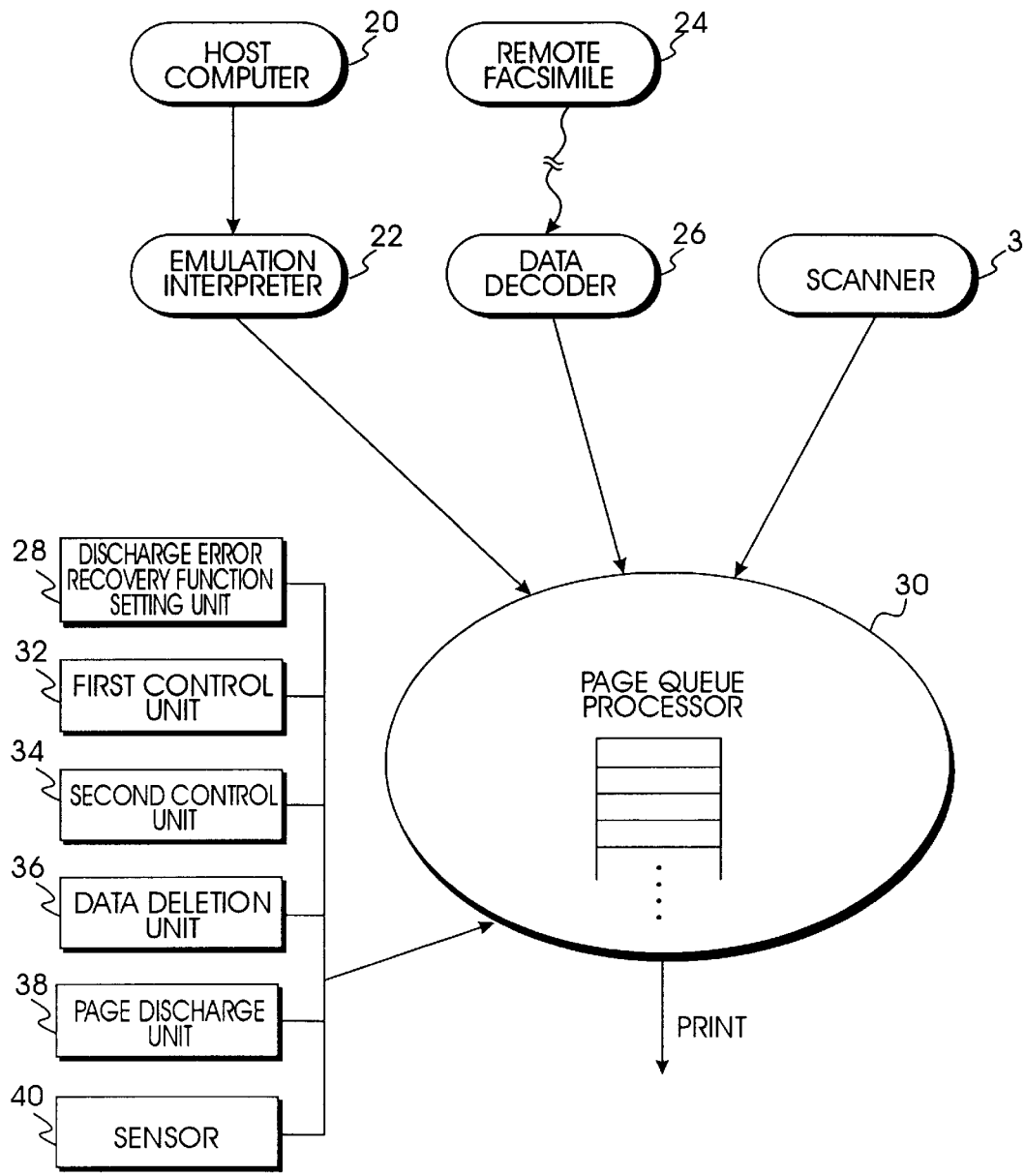
FIG. 2 illustrates a printing operation performed by a page queue processor of a multifunctional machine, according to the principles of the present invention.

Turn now to FIG. 2, which illustrates a printing operation performed by a page queue processor of a multifunctional machine, according to the principles of the present invention. FIG. 2 is a view illustrating a concept of printing performed by a page queue processor of a multifunctional machine of an electrophotographic developing type, according to the principles of the present invention.

As shown in FIG. 2, the multifunctional machine according to the principles of the present invention includes separate modules for forming data pages to be printed, along with a page queue processor which performs printing by operating an engine after receiving a page of data to be printed from each module. Generally, the engine is a main component of a laser printer and indicates a mechanical part for performing the printing operation. Accordingly, components illustrated in FIG. 2 can be engines.

In FIG. 2, the operations of modules and a page queue processor 30 are illustrated as follows. The type of data received by the page queue processor 30 of a printing device can be any one of three types of data: print data, facsimile data, or scan data. The print data is data transmitted from a host computer 30, the facsimile data is data transmitted from a remote facsimile device 24, and the scan data is data transmitted from a scanner unit 28.

Print data can be transmitted from a host computer 22 and interpreted and translated to a format capable of being printed using an emulation interpreter 22. Then the print data is transmitted to the page queue processor 30, in order to be stored there while waiting to be recorded onto a recordable medium.

Facsimile data can be transmitted from a remote facsimile 24 and decoded by a data decoder 26. Then the facsimile data is transmitted to the page queue processor 30, in order to be stored there while waiting to be recorded onto a recordable medium.

Scan data can be transmitted from a scanning unit 3 of the multifunctional machine. Then the scan data is transmitted to the page queue processor 30, in order to be stored there while waiting to be recorded onto a recordable medium.

The page queue processor 30 which receives pages of data to be printed performs printing by operating the print engine. The pages of data to be printed can include the print data, facsimile data, and scan data. When the data to be printed is either print data or scan data, and that data is stored in the page queue processor 30, then the page queue processor 30 judges whether the recovery from the discharge error JAM2 has been performed. After the page queue processor 30 judges that the jam recovery has been performed, then the page queue processor 30 controls the printing process to rapidly record the page of data onto a recordable medium. When the data to be printed is facsimile data, and that data is stored in the page queue processor 30, then the page queue processor 30 ensures the printing of the facsimile data.

Also illustrated in FIG. 2 are the following features: a discharge error recovery function setting unit 28 setting the operation of a discharge error recovery function, a first control unit 32 controlling a page of facsimile data received from remote facsimile 24 to be reprinted after waiting for an error condition to be removed in the case that a discharge error occurs, a second control unit 34 selectively controlling, according to whether a discharge error recovery function is set, one among a page of print data and a page of scan data to be reprinted after waiting for an error condition to be removed in the case that a discharge error occurs, a data deletion unit 36 deleting print data, facsimile data, and scan data from the page queue processor 30, a page discharge unit 38 discharging a printed page, and a sensor 40 detecting when a discharge error occurs. A discharge error occurs when data has been recorded onto a recordable medium but the recordable medium has not been successfully discharged. The discharge error recovery function setting unit 28 can also be referred to as a jam recovery setting unit. The discharge error recovery function which is set by the discharge error recovery function setting unit 28 can also be referred to as a jam recovery function.

Figure 3A:
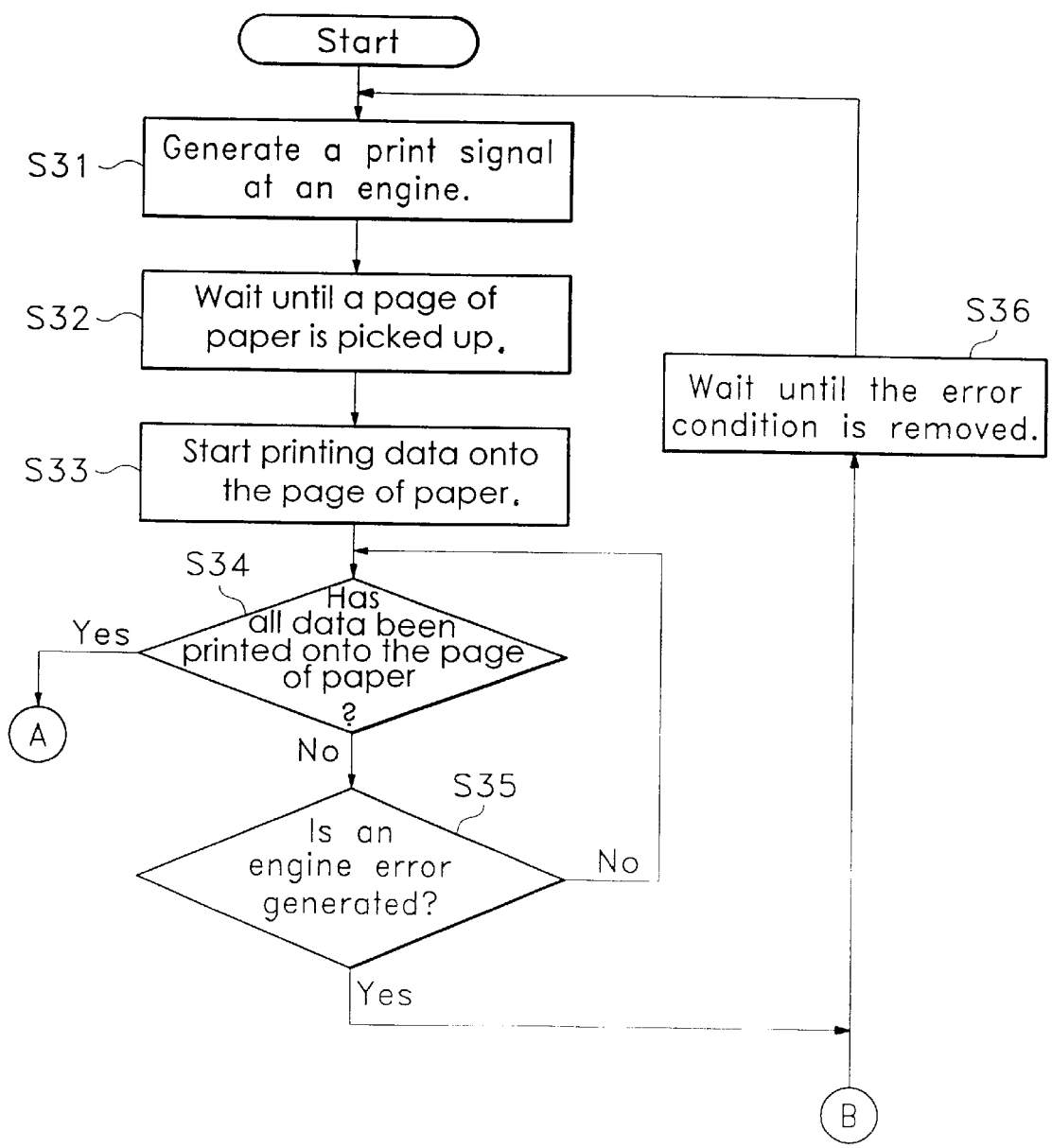
FIGS. 3A and 3B comprise a first section and a second section, respectively, of a flowchart illustrating a selective jam recovery method, according to the principles of the present invention.
Figure 3B:
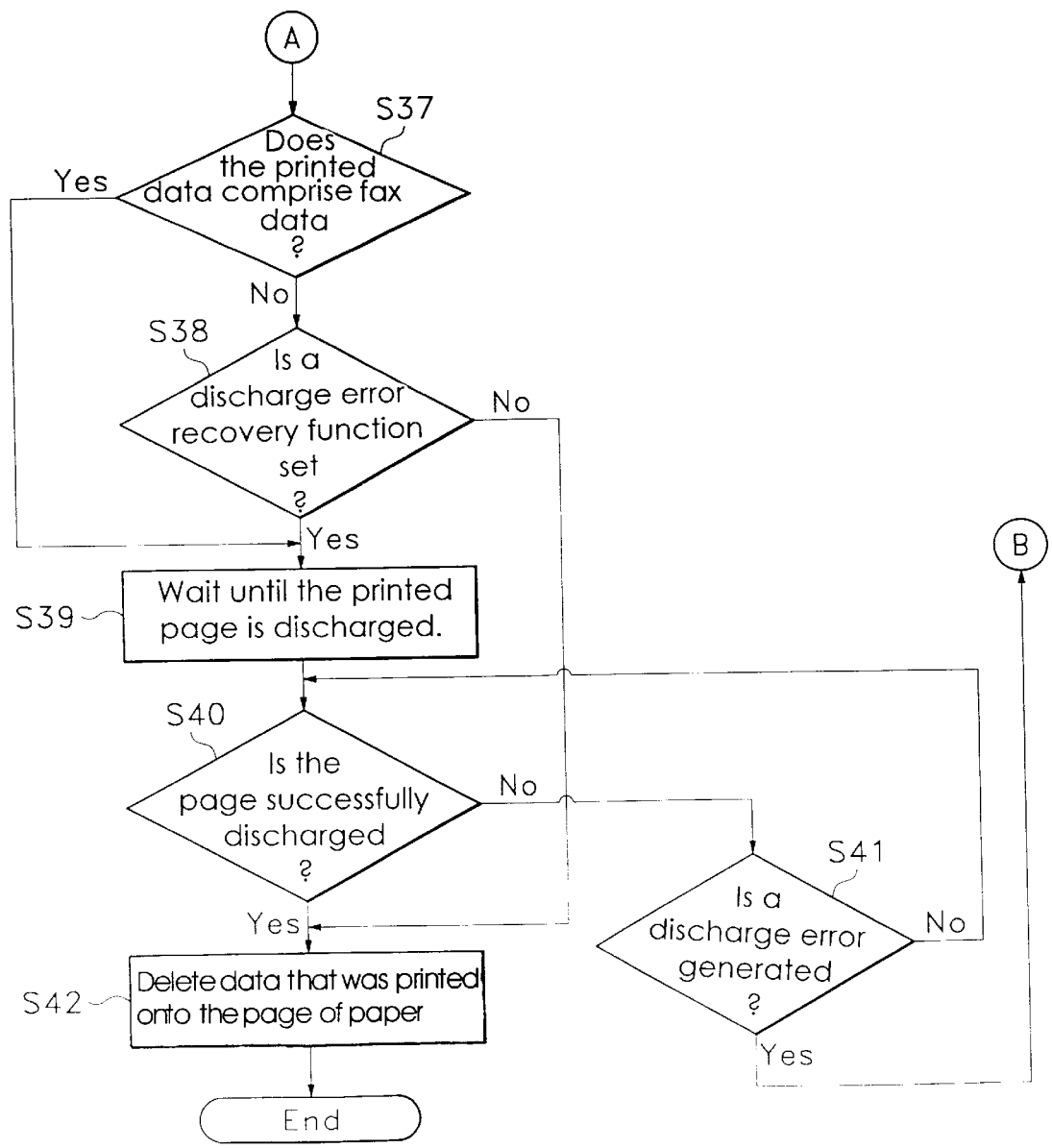

Turn now to FIGS. 3A and 3B, which comprise a first section and a second section, respectively, of a flowchart illustrating a selective jam recovery method, according to the principles of the present invention. FIGS. 3A and 3B are a flowchart illustrating a selective jam recovery method as implemented in a multifunctional device with an image forming unit, where that device is capable of receiving print data from a host computer, scan data from a scan unit, and facsimile data from a remote facsimile machine. In addition, that multifunctional device is capable of recording the data received onto a recordable medium.

As shown in FIGS. 3A and 3B, the selective jam recovery method includes the following steps. At step S31, a page queue processor of the multifunctional device generates a print signal at an engine. Preferably, the engine is a printing unit for printing each page of data stored in the page queue processor. At step S32, there is a delay in order to wait for a page of a recordable medium to be picked up. The page of the recordable medium can be a blank page of paper. The page of paper can be picked up by transportation rollers. At step S33, the process of recording data onto the page of paper begins. In other words, the process of printing data onto the page of paper begins. At step S34, a determination is made as to whether all data has been printed onto the page of paper. The determination of step S34 is performed by a central control unit.

If not all data has been printed onto the page of paper, then step S35 is performed. At step S35, a determination is made as to whether an engine error signal has been generated. If no engine error signal has been generated, then step S34 is performed again. However, if an error signal has been generated, then step S36 is performed. At step S36, there is a delay in order to wait until the error condition is removed. After step S36 is performed, then step S31 is performed again. Thus, the data is prepared in order to be reprinted.

When all data has been printed onto the page of paper, then step S37 of FIG. 3B is performed. At step S37, a determination is made as to whether the data printed onto the page of paper is facsimile data. In other words, a determination is made as to whether the data printed onto the page of paper was received from a remote facsimile machine. If the data printed onto the page of paper was not facsimile data, then step S38 is performed. Thus, step S38 will be performed if the data printed onto the page of paper was print data received from a host computer. In addition, step S38 will be performed if the data printed onto the page of paper was scan data received from a scanner unit. At step S38, a determination is made as to whether a discharge error recovery function is set. Preferably, the setting of the discharge error recovery function is performed by a discharge error recovery function setting unit.

If the result of step S37 is that the data printed onto the page of paper was facsimile data, then step S39 will be performed. If the result of step S38 is that the discharge error recovery function is set, then step S39 will be performed. At step S39, there is a delay in order to wait until the page of paper is discharged successfully from the aforementioned multifunctional device.

At step S40, a determination is made as to whether the page of paper has been successfully discharged from the multifunctional device. Step S40 is performed by a page discharge unit. At step S41, if the page of paper has not been successfully discharged yet, a determination is made as to whether a discharge error has been generated. If no discharge error is detected at step S41, then step S40 is performed again. Alternatively, if a discharge error is detected at step S41, then step S36 and then step S31, both of FIG. 3A, are performed again. Thus, the data must be reprinted starting from step S31.

If the page of paper has been successfully discharged, then step S42 will be performed. Also, if the discharge error recovery function is not set, then step S42 will be performed. At step S42, if the page of paper has been successfully discharged, then the data that was printed onto the page of paper is deleted from the page queue processor.

Thus, in the case that the data to be printed is print data, the data is successfully printed onto the page of paper, and the discharge error recovery function is not set, then the data is removed from the page queue processor without waiting for the page of paper to be discharged from the multifunctional device. This is demonstrated by the sequence of steps S37, S38, and S42.

In the case that the data to be printed is scan data, the data is successfully printed onto the page of paper, and the discharge error recovery function is not set, then the data is removed from the page queue processor without waiting for the page of paper to be discharged from the multifunctional device. This is demonstrated by the sequence of steps S37, S38, and S42.

In the case that the data to be printed is facsimile data and the data is successfully printed onto the page of paper, then the data is not removed from the page queue processor until the page of paper has been successfully discharged from the multifunctional device. This is demonstrated by the sequence of steps S37, S39, S40, and S42.

As described above, when the printing of data is performed by the page queue processor and the data is one of print data and scan data, the recovery from a discharge error JAM2 will be determined according to the user's selection. When the page of data to be printed is facsimile data, the recovery from the discharge error JAM2 is always performed.

Thus, when the page of data to be printed is facsimile data, the discharge error JAM2 must be cleared and the page of paper must be successfully discharged before the data can be removed from the page queue processor, without regard to the condition of the discharge error recovery function. The page queue processor stores data format of each page of data.

As a result of the present invention, printing performance is enhanced by a rapid page processing through a quick turnaround for the print data and the scan data, and the completed page of the fax data can unconditionally be received though its property is rather degraded. Accordingly, the entire printing performance can be enhanced by performing the page printing suitable to each characteristic.

The foregoing paragraphs describe the details of a multifunctional machine, and more particularly a multifunctional machine equipped with a jam recovery device and a selective method for recovering from a jam when a jam occurs while printing data using an electrophotographic developing method.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A multifunctional image forming apparatus performing a jam recovery function improving printing efficiency, comprising:

a print unit printing general data onto a recordable medium to form an image on the recordable medium, wherein said general data is selected from a group consisting of a first data and a second data;

a page queue unit storing said general data, transmitting said general data to said print unit, and controlling said print unit;

a page discharge unit discharging the recordable medium from said image forming apparatus when said general data has been printed onto the recordable medium;

a jam recovery setting unit controlling a jam recovery function;

a data deletion unit deleting said general data from said page queue unit;

a sensor detecting a discharge error, said discharge error being detected when said general data has been printed onto the recordable medium and said recordable medium has not been discharged by said page discharge unit;

a first control unit controlling said first data when said discharge error is detected, and enabling said print unit to reprint said first data when said discharge error is detected; and a second control unit controlling said second data according to said jam recovery setting unit when said discharge error is detected, enabling said print unit to reprint said second data when said discharge error is detected and said jam recovery function is set, and not enabling said print unit to reprint said second data when said discharge error is detected and said jam recovery function is not set.

2. The image forming apparatus of claim 1, wherein said first data comprises facsimile data received by said image forming apparatus from a remote facsimile unit.

3. The image forming apparatus of claim 2, wherein said second data is selected from a group consisting of print data received from a host computer and scan data received from a scanner unit.

4. The image forming apparatus of claim 1, wherein said second control unit deletes said general data from said page queue unit when said jam recovery function is not set.

5. The image forming apparatus of claim 1, wherein said print unit is selected from a group consisting of an impact dot matrix printer, thermal inkjet printer, piezo inkjet printer, phase-change inkjet printer, and electrophotographic printer.

6. The image forming apparatus of claim 1, wherein said first data further comprises one page of said general data.

7. The image forming apparatus of claim 1, wherein said second data further comprises one page of said general data.

8. The image forming apparatus of claim 1, further comprising a plurality of rollers transporting the recordable medium along a path of conveyance through said image forming apparatus.

9. A jam recovery method in a multifunctional image forming apparatus, comprising the steps of:

receiving general data and storing said general data in a page queue unit, wherein said general data is selected from a group consisting of a first data and a second data;

printing a quantity of said general data onto a recordable medium to form an image on the recordable medium;

when said first data is printed onto the recordable medium and the recordable medium is not discharged from said image forming apparatus, reprinting said first data;

when said first data is printed onto the recordable medium and the recordable medium is discharged from said image forming apparatus, removing said first data from said page queue unit;

when said second data is printed onto the recordable medium and the recordable medium is discharged from said image forming apparatus, removing said second data from said page queue unit; and when said second data is printed onto the recordable medium and the recordable medium is not discharged from said image forming apparatus, reprinting said second data according to a jam recovery function.

10. The method of claim 9, wherein said quantity of said general data corresponds to one page.

11. The method of claim 9, further comprising the step of:

when said second data is printed onto the recordable medium and the recordable medium is not discharged from said image forming apparatus and said jam recovery function is set, reprinting said second data.

12. The method of claim 11, further comprising the step of:

when said second data is printed onto the recordable medium and the recordable medium is not discharged from said image forming apparatus and said jam recovery function is not set, not reprinting said second data.

13. The method of claim 9, wherein said first data comprises facsimile data received by said image forming apparatus from a remote facsimile unit.

14. The method of claim 13, wherein said second data is selected from a group consisting of print data received from a host computer and scan data received from a scanner unit.

15. The method of claim 9, further comprising the steps of:

when said general data is printed onto the recordable medium, the recordable medium is not discharged from said image forming apparatus, and the recordable medium is jammed in said image forming apparatus, detecting a discharge error; and when the recordable medium jammed in said image forming apparatus is removed from said image forming apparatus, clearing said discharge error.

16. The method of claim 15, further comprising the steps of:

when said first data is printed onto the recordable medium, said discharge error is detected, and said discharge error is cleared, reprinting said first data;

when said second data is printed onto the recordable medium, said discharge error is detected, said discharge error is cleared, and said jam recovery function is set, reprinting said second data; and when said second data is printed onto the recordable medium, said discharge error is detected, said discharge error is cleared, and said jam recovery function is not set, removing said second data from said page queue unit.

17. The method of claim 9, further comprising the steps of:

detecting a print engine error when said printing step is unsuccessful, said printing step being unsuccessful when said general data is not printed onto the recordable medium;

discontinuing said printing step when said print engine error is detected; and clearing said print engine error and then reprinting said general data onto the recordable medium.

* * * * *